US012716229B2

(12) United States Patent
George et al.

(10) Patent No.: US 12,716,229 B2
(45) Date of Patent: Aug. 25, 2026

(54) NONPARALLEL BI-PART PARTITION AND RELATED COMPONENTS AND METHODS

(71) Applicant: Won-Door Corporation, Salt Lake City, UT (US)

(72) Inventors: Michael D. George, Kaysville, UT (US); Logan Keith Brown, South Jordan, UT (US)

(73) Assignee: Won-Door Corporation, Salt Lake City, UT (US)

( * ) Notice: Subject to any disclaimer, the term of this patent is extended or adjusted under 35 U.S.C. 154(b) by 139 days.

(21) Appl. No.: 18/626,955

(22) Filed: Apr. 4, 2024

(65) Prior Publication Data

US 2025/0314057 A1 Oct. 9, 2025

(51) Int. Cl.
*E04B 1/34* (2006.01)
*E04B 1/343* (2006.01)
*E06B 3/46* (2006.01)

(52) U.S. Cl.
CPC ............ *E04B 1/343* (2013.01); *E06B 3/4654* (2013.01)

(58) Field of Classification Search
CPC .......... E06B 3/46; E06B 3/4654; E06B 3/469; E06B 3/481; E06B 3/928; E06B 3/94; E06B 5/16; E06B 5/168; E06B 9/06; E04B 1/343
USPC ............................ 52/1; 160/84.08, 118, 199
See application file for complete search history.

(56) References Cited

U.S. PATENT DOCUMENTS 3,003,200 A * 10/1961 Hansen ................. E06B 3/4654 160/90
3,223,147 A * 12/1965 Holloway ................. E06B 3/94 160/84.09
3,318,047 A * 5/1967 Carson ...................... E06B 3/50 49/155
3,334,444 A * 8/1967 Hargrove ................ E05F 1/025 49/404

(Continued)

FOREIGN PATENT DOCUMENTS

CN 210264359 U * 4/2020
CN 220378118 U * 1/2024

(Continued)

OTHER PUBLICATIONS

BLACKBEE3D—Sliding Door; waybackmachine; May 19, 2023; https://blackbee3d.com/product/sliding-door-sld-corner-xo-multi-slide-revit-family-sketchup/ (Year: 2023).*

*Primary Examiner* — Ryan D Kwiecinski
(74) *Attorney, Agent, or Firm* — TraskBritt

(57) ABSTRACT

A bi-part partition system includes a first door configured to extend and retract along a first direction, the first door having a first lead post including a male protrusion extending from the first lead post. The bi-part partition system further comprises a second door configured to extend and retract along a second direction, the second door having a second lead post including a female receptacle, the female receptacle having a size and shape configured to receive the male protrusion of the first lead post therein along an insertion direction. The male protrusion may be oriented on the first lead post and the female receptacle may be oriented on the second lead post such that the insertion direction is substantially parallel to one of the first and second directions and is substantially perpendicular to the other of the first and second directions.

20 Claims, 11 Drawing Sheets

(56) References Cited

U.S. PATENT DOCUMENTS

| | | | | | |
|---|---|---|---|---|---|
| 3,799,237 | A * | 3/1974 | Proserpi | E06B 3/481 160/199 |
| 3,990,183 | A * | 11/1976 | Meggs | E05D 15/36 49/257 |
| 4,131,971 | A * | 1/1979 | Saarloos | E06B 3/481 16/225 |
| 4,834,161 | A * | 5/1989 | Johnson | E05B 65/087 160/199 |
| 4,878,530 | A * | 11/1989 | Jean | E06B 3/481 160/211 |
| 4,924,929 | A * | 5/1990 | Johnson | E06B 3/94 160/199 |
| 5,908,064 | A * | 6/1999 | Bruce | A47K 3/362 160/202 |
| 6,296,038 | B1 * | 10/2001 | Chen | E06B 3/481 160/40 |
| 6,330,902 | B1 * | 12/2001 | Chen | E06B 3/481 160/199 |
| 6,990,771 | B2 * | 1/2006 | Pfaff | E05F 15/643 49/94 |
| 7,066,297 | B2 * | 6/2006 | Goodman | E05F 15/632 49/27 |
| 7,478,663 | B2 * | 1/2009 | Goodman | E05F 15/635 160/84.02 |
| 7,845,386 | B2 * | 12/2010 | Coleman | E05D 15/26 160/84.01 |
| 7,874,341 | B2 | 1/2011 | Coleman et al. | |
| 7,886,804 | B2 | 2/2011 | Goodman et al. | |
| 7,931,067 | B2 | 4/2011 | Goodman et al. | |
| 8,235,085 | B2 | 8/2012 | Coleman et al. | |
| 8,240,354 | B2 * | 8/2012 | Coleman | E05D 15/063 160/188 |
| 8,316,914 | B2 | 11/2012 | Bell et al. | |
| 8,387,322 | B2 | 3/2013 | George | |
| 8,448,688 | B2 | 5/2013 | Goodman et al. | |
| 8,479,798 | B2 | 7/2013 | Goodman | |
| 8,522,853 | B2 | 9/2013 | Coleman et al. | |
| 8,627,618 | B2 | 1/2014 | Knight et al. | |
| 8,863,814 | B2 * | 10/2014 | Smart | E06B 9/0669 160/40 |
| 9,364,121 | B2 * | 6/2016 | Sprague | E05D 15/0686 |
| 11,105,132 | B2 * | 8/2021 | Frankel | E06B 3/4654 |
| 2004/0003556 | A1 * | 1/2004 | Zerbst | E05D 15/0643 52/239 |
| 2009/0188633 | A1 * | 7/2009 | Goodman | E06B 3/94 160/84.08 |
| 2010/0012280 | A1 * | 1/2010 | Hans | E06B 3/481 160/405 |
| 2011/0000625 | A1 | 1/2011 | George | |
| 2011/0088322 | A1 * | 4/2011 | Coleman | E05B 65/104 49/7 |
| 2011/0247764 | A1 * | 10/2011 | Coleman | E05F 15/643 160/368.1 |
| 2012/0011789 | A1 * | 1/2012 | Henriott | E06B 3/46 52/239 |
| 2012/0055003 | A1 * | 3/2012 | Coleman | E05D 15/063 29/428 |
| 2013/0067818 | A1 | 3/2013 | Stewart | |
| 2013/0133844 | A1 | 5/2013 | Smart et al. | |
| 2013/0240160 | A1 | 9/2013 | Coleman et al. | |
| 2017/0167176 | A1 * | 6/2017 | Goodman | E06B 9/68 |
| 2017/0218683 | A1 * | 8/2017 | Shanahan | E05D 15/264 |
| 2017/0360262 | A1 * | 12/2017 | Wei | A47K 3/34 |
| 2022/0154506 | A1 * | 5/2022 | Coleman | E05D 15/0652 |
| 2022/0290426 | A1 * | 9/2022 | Brown | E04B 2/7455 |
| 2025/0290364 | A1 * | 9/2025 | Green | E05D 15/165 |
| 2025/0314057 | A1 * | 10/2025 | George | E04B 1/343 |

FOREIGN PATENT DOCUMENTS

| | | | | |
|---|---|---|---|---|
| DE | 102011000318 | A1 * | 7/2012 | E06B 5/16 |
| DE | 102011115536 | A1 * | 2/2013 | E05D 15/0621 |
| WO | WO-03004394 | A2 * | 1/2003 | E06B 3/827 |

* cited by examiner

NONPARALLEL BI-PART PARTITION AND RELATED COMPONENTS AND METHODS

TECHNICAL FIELD

The present disclosure relates generally to moveable partitions installed within buildings and employed to separate interior spaces therein, and, more particularly, to automatic moveable partitions that are opened and closed using an electro-mechanical system, and to methods of installing and using such moveable partitions.

BACKGROUND

Automatic doors are implemented in various configurations such as, for example, sliding doors, rotating panel doors, folding doors, and revolving doors. Automatic doors are often relied on for security and fire safety purposes. For example, referring to FIG. 1, an automatic door system 100 including one or more folding accordion-panel partitions or doors 102A and 102B may be used as a security and/or a fire door. The doors 102A and 102B shown include a plurality of panels 104, which are connected to one another with hinge-like members 106. The hinged connection of the panels 104 allows the doors 102A and 102B to be compactly stored in pockets 108 formed in the walls 110 of a building when in a retracted or folded state. When the doors are required to secure an area, such as an elevator lobby 112 during a fire, the doors 102A and 102B are driven by a motor (not shown) along a track 114 in order to provide an appropriate barrier.

As shown in FIGS. 1 and 2, two doors 102A and 102B may be utilized, wherein each extends from its associated pocket 108 to cooperatively connect with one another upon closing of the doors 102A, 102B. Referring to FIG. 2, a cross-sectional view is shown of two doors 102A and 102B (shown in a folded state and recessed in pockets 108). The first door 102A includes a male lead post 116 which is configured to cooperatively mate with the female lead post 118 of the second door 102B when each door is properly extended. Such a partition including two cooperating doors is referred to herein as a "bi-part partition."

In other embodiments, an automatic door system 100 may comprise a single door which mates with a stationary structure to form a barrier. As shown in FIG. 3, a single door 102A may include a male lead post 116 which is configured to mate with a female door post 118' formed in a wall 110.

As can also be seen in FIGS. 2-3, a folding accordion-panel partition door 102A may include a first accordion-panel partition 119A and a second accordion-panel partition 119B which is laterally spaced from and substantially parallel with the first partition 119A. Each of the two partitions 119A and 119B has a first end 120 structurally fixed to a jamb 121, which may be movable and "floating" within the pocket 108, and a second end 122, which is attached to the male lead post 116. Such a configuration is often utilized as a fire door wherein one partition 119A acts as a primary fire and smoke barrier, the space 124 between the two partitions 119A and 119B acts as an insulator or a buffer zone, and the second partition 119B acts as a secondary fire and smoke barrier.

The automatic door system 100 may further include various sensors and switches to assist in the control of the doors 102A and 102B. For example, as shown in FIG. 1, either of the doors 102A and 102B (or possibly both), when used as a fire door, may include a switch or actuator 126 commonly referred to as "panic hardware." Actuation of the panic hardware 126 allows a person located on one side of the doors 102A and 102B to cause the door(s) to open if they are closed, or to stop while they are closing, allowing access through the barrier formed by the door(s) for a predetermined amount of time.

Typically, the two doors of a bi-part partition are oriented coplanar to one another, and they extend and retract linearly in and along the common plane in which they are oriented. Occasionally, it is necessary for the bi-part partition to be non-planar. For example, FIG. 1 illustrates an elevator lobby in which a partition extends from a first wall 110 to a second wall 110 oriented perpendicular to the first wall 110. Thus, the automatic door system 100 has doors 102 and 102B that extend along a curved track to close the partition. The panels 104 and hinge like members 106 are typically formed of sheet metal, which is not very flexible. The nature and configuration of the doors 102A and 102B requires that the curvature of the curved track have at least a minimum radius, depending upon the configuration of the doors 102A and 102B for proper operation of the partition without causing damage to the doors 102A and 102B, which can lead to undesirable constraints on the design of the building in which the partition is to be installed, or undesirable constraints on the configuration of the partition itself.

BRIEF SUMMARY

According to an embodiment of the present disclosure, a bi-part partition system includes a first door configured to extend and retract along a first direction. The first door having a first lead post including a male protrusion extending from the first lead post. The bi-part partition system further comprises a second door configured to extend and retract along a second direction. The second door has a second lead post including a female receptacle, which has a size and shape configured to receive the male protrusion of the first lead post therein along an insertion direction. The male protrusion is oriented on the first lead post and the female receptacle is oriented on the second lead post such that the insertion direction is substantially parallel to one of the first and second directions and is substantially perpendicular to the other of the first and second directions.

According to another embodiment of the present disclosure, an automatic bi-part partition system includes a first door configured to extend and retract along a first direction. The first door has a first lead post including a male protrusion extending from the first lead post. The automatic bi-part partition system further includes a second door configured to extend and retract along a second direction. The second door has a second lead post including a female receptacle, which has a size and shape configured to receive the male protrusion of the first lead post therein along an insertion direction. The male protrusion is oriented on the first lead post and the female receptacle is oriented on the second lead post such that the insertion direction is substantially parallel to one of the first and second directions and is substantially perpendicular to the other of the first and second directions. An electro-mechanical system is operatively coupled with each of the first door and the second door and is configured to extend and retract the first door and to extend and retract the second door. The electro-mechanical system includes a first motor operatively coupled with the first door and configured to extend and retract the first door, and a second motor operatively coupled with the second door and configured to extend and retract the second door. A control system is operatively coupled with and configured to control each of the first motor and the second motor. The control system is configured to close the bi-part partition system by extending the second door to a predetermined extended position and, thereafter, move the first door to insert the male protrusion into the female receptacle while the second door remains substantially stationary.

In yet additional embodiments, the present disclosure includes a method of operating a bi-part partition system. The method includes extending a first door along a first direction. The first door has a first lead post including a male protrusion extending from the first lead post. The method further includes extending a second door along a second direction. The second door has a second lead post including a female receptacle, which has a size and shape configured to receive the male protrusion of the first lead post therein along an insertion direction. The method further comprises positioning the second door at a predetermined extended position and, thereafter, moving the first door to insert the male protrusion into the female receptacle along an insertion direction while the second door remains substantially stationary at the predetermined extended position. The insertion direction is substantially parallel to one of the first and second directions and is substantially perpendicular to the other of the first and second directions.

The foregoing and other features and advantages of the embodiments will be made more apparent from the description of embodiments of the present disclosure and accompanying drawings.

BRIEF DESCRIPTION OF THE DRAWINGS

For a detailed understanding of the present disclosure, reference should be made to the following detailed description, taken in conjunction with the accompanying drawings, in which like elements have generally been designated with like numerals, and wherein.

DETAILED DESCRIPTION

Figure 1:
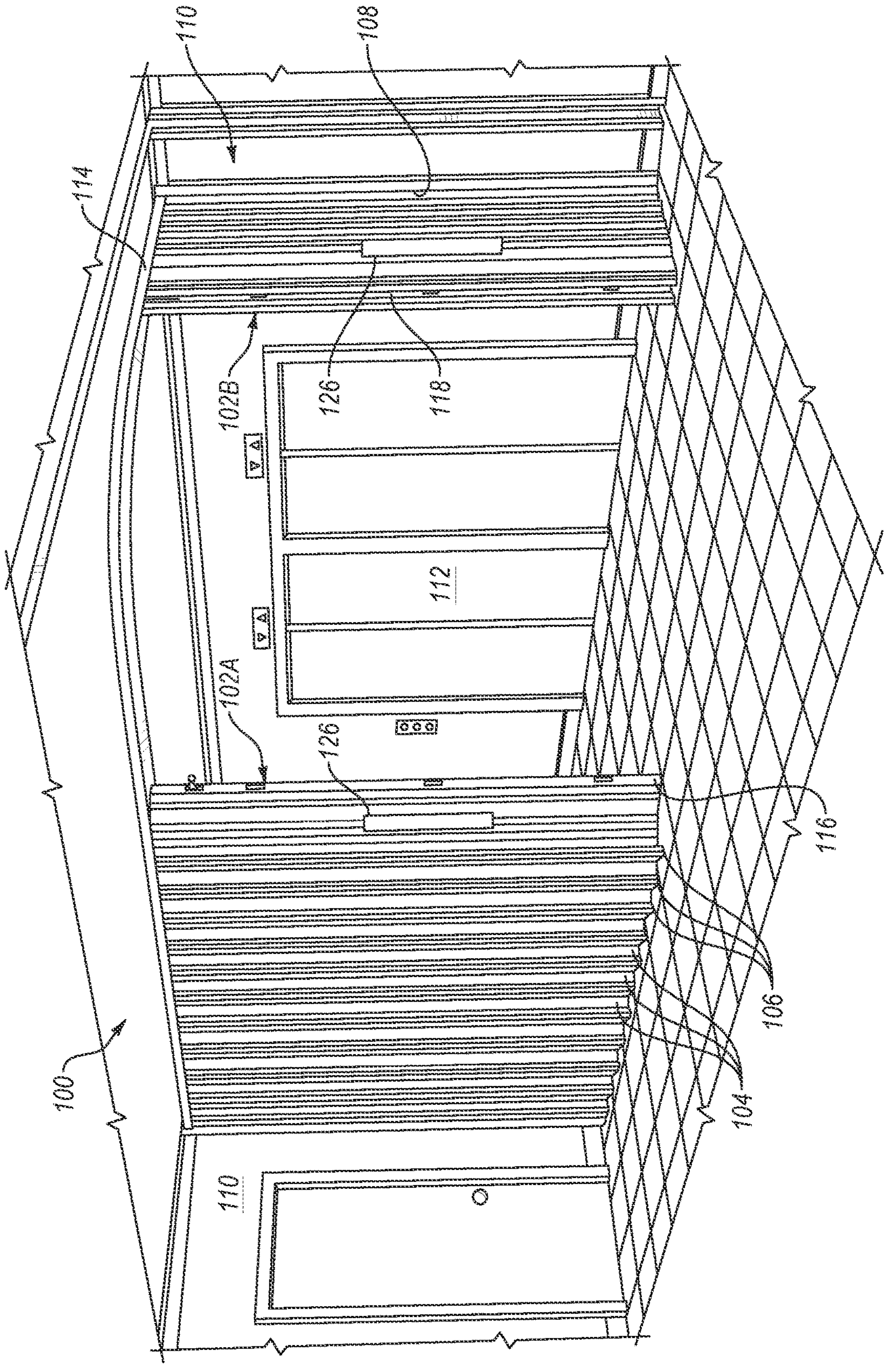
FIG. 1 (Prior Art)
FIG. 1 is a perspective view of a prior art automatic door system.

The illustrations presented herein are not actual views of any bi-parting partitions, or any component thereof, but are merely idealized representations, which are employed to describe embodiments of the present invention.

As used herein, the singular forms following "a," "an," and "the" are intended to include the plural forms as well, unless the context clearly indicates otherwise.

As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features, and methods usable in combination therewith should or must be excluded.

As used herein, any relational term, such as "first," "second," "top," "bottom," "upper," "lower," "above," "beneath," "side," "upward," "downward," etc., is used for clarity and convenience in understanding the disclosure and accompanying drawings, and does not connote or depend on any specific preference or order, except where the context clearly indicates otherwise. For example, these terms may refer to an orientation of elements of any bi-parting partitions when utilized in a conventional manner. Furthermore, these terms may refer to an orientation of elements of any partitions as illustrated in the drawings.

As used herein, the term "substantially" in reference to a given parameter, property, or condition means and includes to a degree that one skilled in the art would understand that the given parameter, property, or condition is met with a small degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter, as well as variations resulting from manufacturing tolerances, etc.).

Figure 4:
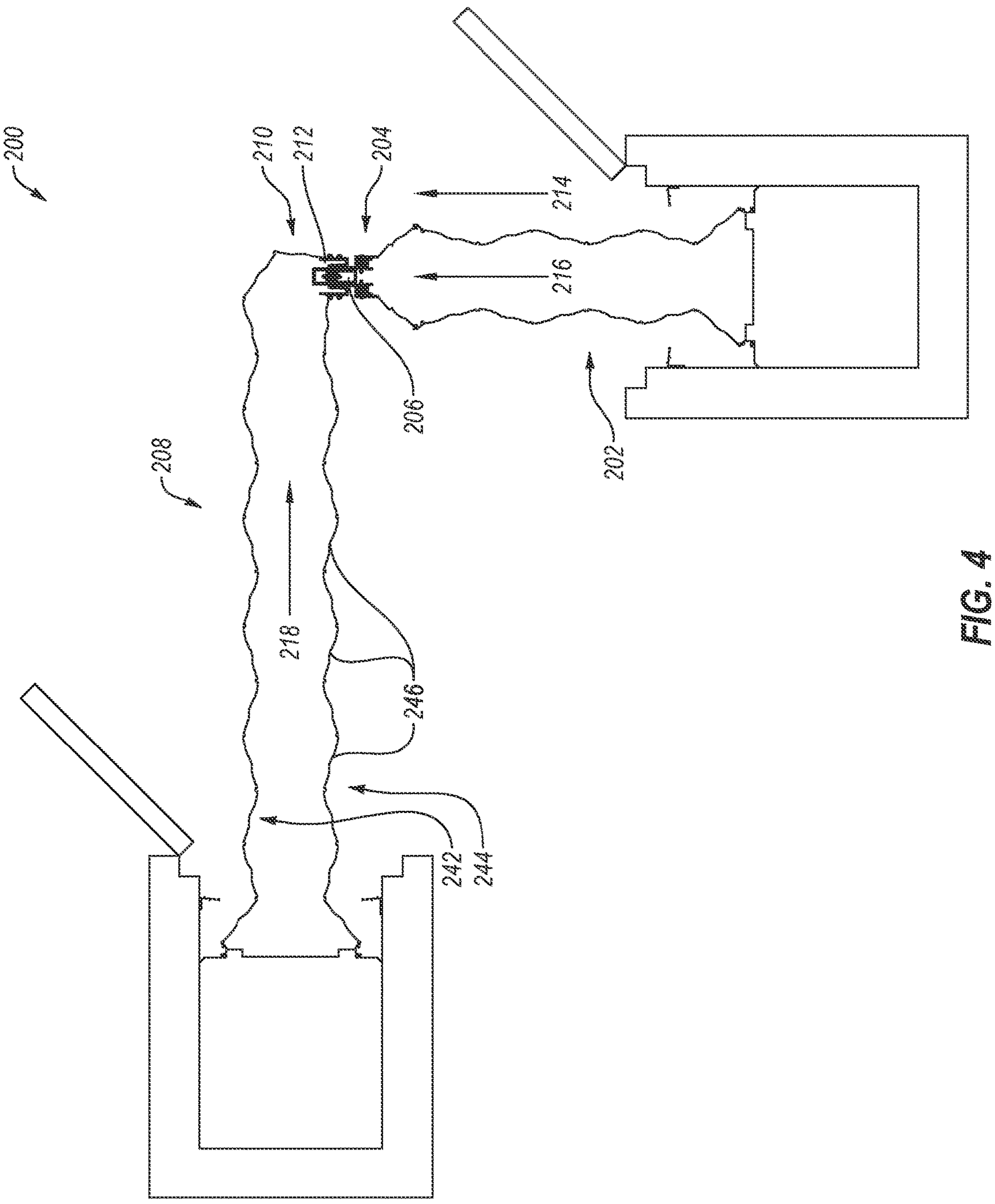
FIG. 4 is a schematic top cross-sectional view of an automatic door system according to the present disclosure.

FIG. 4 is a top cross-sectional view of a bi-part partition system 200 including a first door 202 and a second door 208 in accordance with the present disclosure. The bi-part partition system 200 is suitable for use as a security and/or a fire barrier, although the partition system 200 may be employed for any other suitable purpose as well. In addition to being a fire barrier, the bi-part partition system 200 may be used for partitioning space, as a sound barrier, as a security barrier, for combinations of such purposes, or for other purposes. The first and second doors 202 and 202 are shown as being fully extended and cooperatively mated in a closed configuration.

Figure 2:
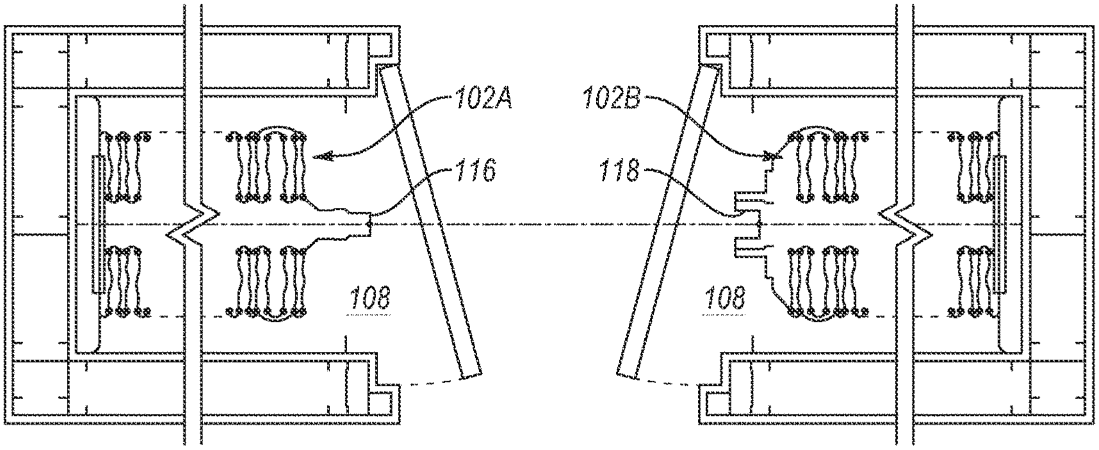
FIG. 2 (Prior Art)
FIG. 2 is a top cross-sectional schematic view of a prior art automatic door system with bi-parting partitions.
Figure 3:
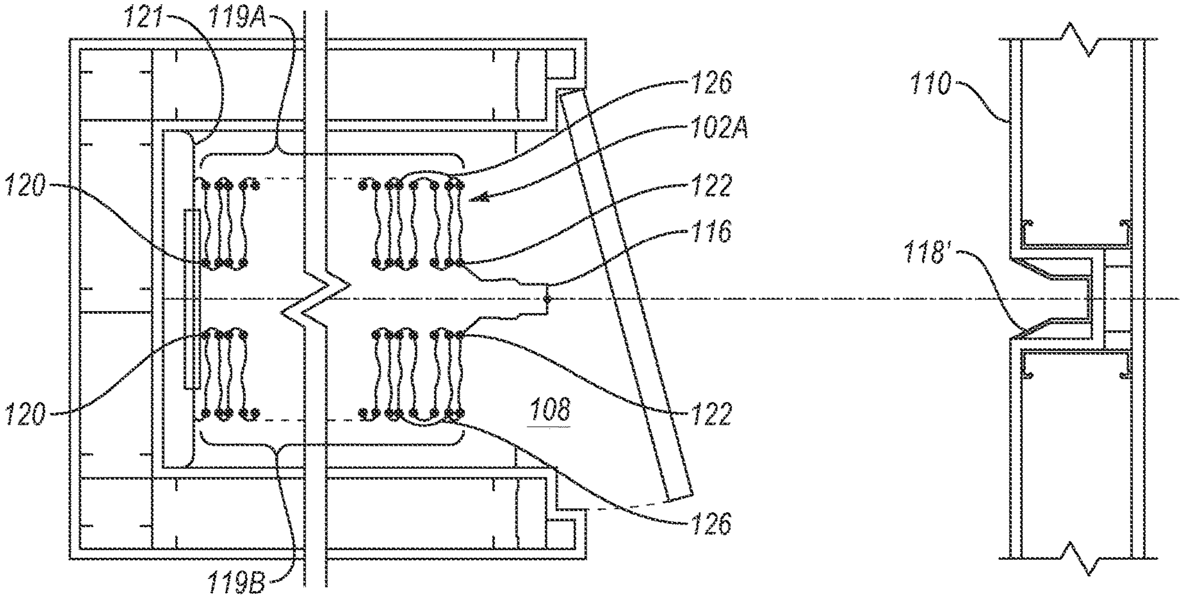
FIG. 3 (Prior Art)
FIG. 3 is a top cross-sectional schematic view of a prior art automatic door system with only one partition.

The doors 202 and 208 may be folding accordion-panel partition doors. The folding accordion-panel partition doors 202, 208 may be comprised of multiple layers of material. As a non-limiting example, each of the folding accordion panel partition doors 202, 208 may comprise a first accordion-panel partition 242 and a second accordion-panel partition 244. The accordion-panel partitions 242 and 244 may be laterally spaced from and substantially parallel with each other. The accordion-panel partitions 242 and 244 may be oriented to extend in substantially parallel directions to one another. The accordion-panel partitions 242 and 244 may be comprised of a plurality of panels 246 which are hingedly connected. The hinged connection of the plurality of panels may allow the accordion-panel partitions 242 and 244 to fold and collapse into a folded configuration and extend to the closed configuration (as previously discussed in relation to FIGS. 1-3). The panels 246 may be comprised of a hard thin material, such as sheet metal.

The first door 202 may comprise a first lead post 204 connected to the first door 202 at the leading end of the first door 202. The second door 208 may comprise a second lead post 210 connected to the second door 208 at the leading end of the second door 208. The first and second doors 202 and 208 may be capable of folding and extending in an accordion like manner with the lead posts 204 and 210 attached. The doors 202 and 208 may be in the folded configuration in pockets defined in the walls of the building in which it is installed in the open configuration.

The first door 202 and first lead post 204 may be configured to extend and retract in a first direction 216. The second door 208 and the second lead post 210 may be configured to extend and retract in a second direction 218. The first direction 216 and the second direction 218 may be substantially perpendicular to one another. The first lead post 204 may be oriented such that it extends and retracts along an insertion direction 214. The insertion direction 214 may be parallel to either the first direction 216 or the second direction 218 and perpendicular to the other of the first direction 216 and the second direction 218.

The bi-part partition system 200 may be automatically extended, automatically retracted, or both automatically extended and automatically retracted. The bi-part partition system 200 may comprise motors, for example, to drive movement of the doors 202 or 208 between the folded and closed configurations. In additional embodiments, the bi-part partition system 200 may be a manually operated system, or a system that may be operated automatically or manually.

Figure 5:
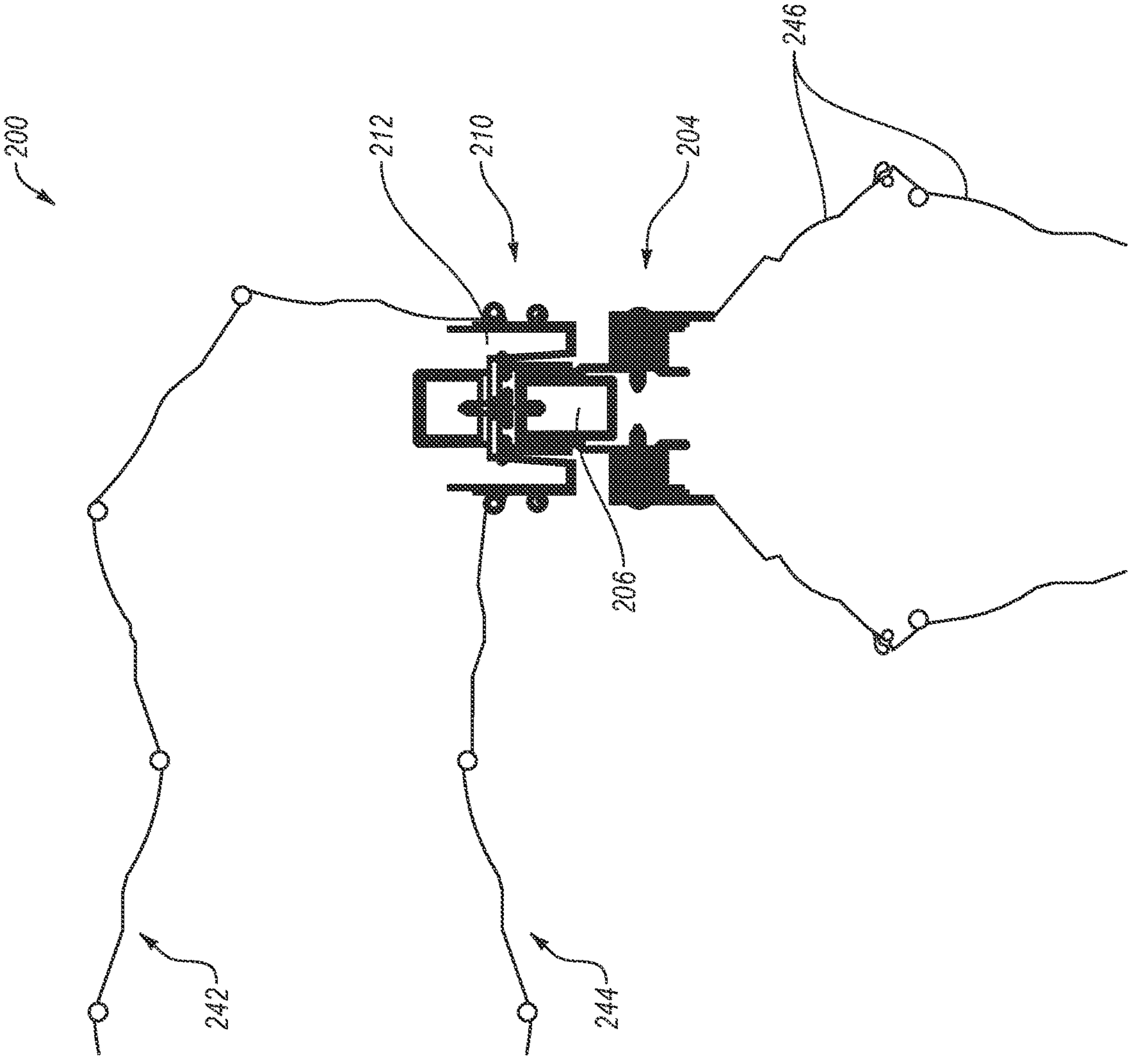
FIG. 5 is an enlarged view of a portion of FIG. 4.

FIG. 5 is an enlarged cross-sectional view of the bi-part partition system 200 shown in FIG. 4. With reference to FIG. 5, the first lead post 204 of the first door 202 may comprise a male protrusion 206 attached to the first lead post 204. The second lead post 210 of the second door 208 may comprise a female receptacle 212 attached to the second lead post 210. The male protrusion 206 may extend from the first lead post 204. Moreover, the female receptacle 212 may have a size and shape configured to receive the male protrusion 206. When the male protrusion 206 and the female receptacle 212 are in contact, they may be in the closed configuration.

Figure 6:
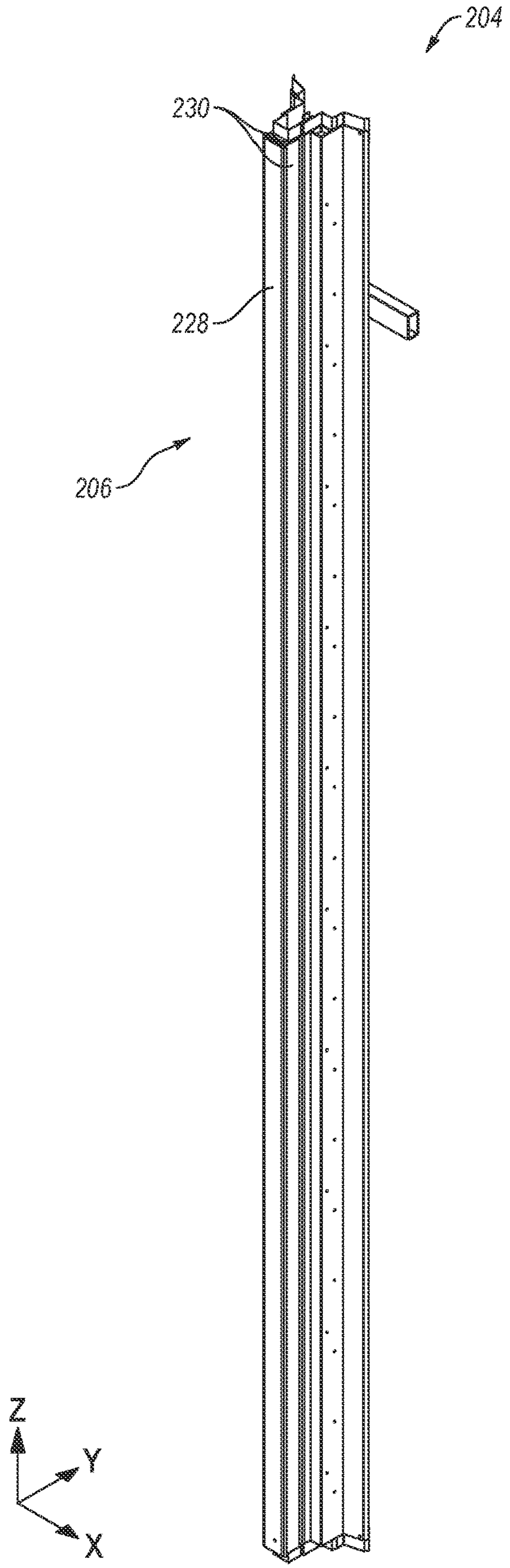
FIG. 6 is a perspective view of a lead post with a male protrusion of the automatic door system of FIGS. 4 and 5.

FIG. 6 is a perspective view of the first lead post 204 with the male protrusion 206. With reference to FIG. 6, the first lead post 204 is elongated in a vertical direction. The vertical elongation of the first lead post 204 allows the first lead post 204 to define a barrier extending at least substantially between the floor and the ceiling when the doors 202, 208 are in the closed configuration and the first lead post 204 is coupled with the second lead post 210.

Figure 7:
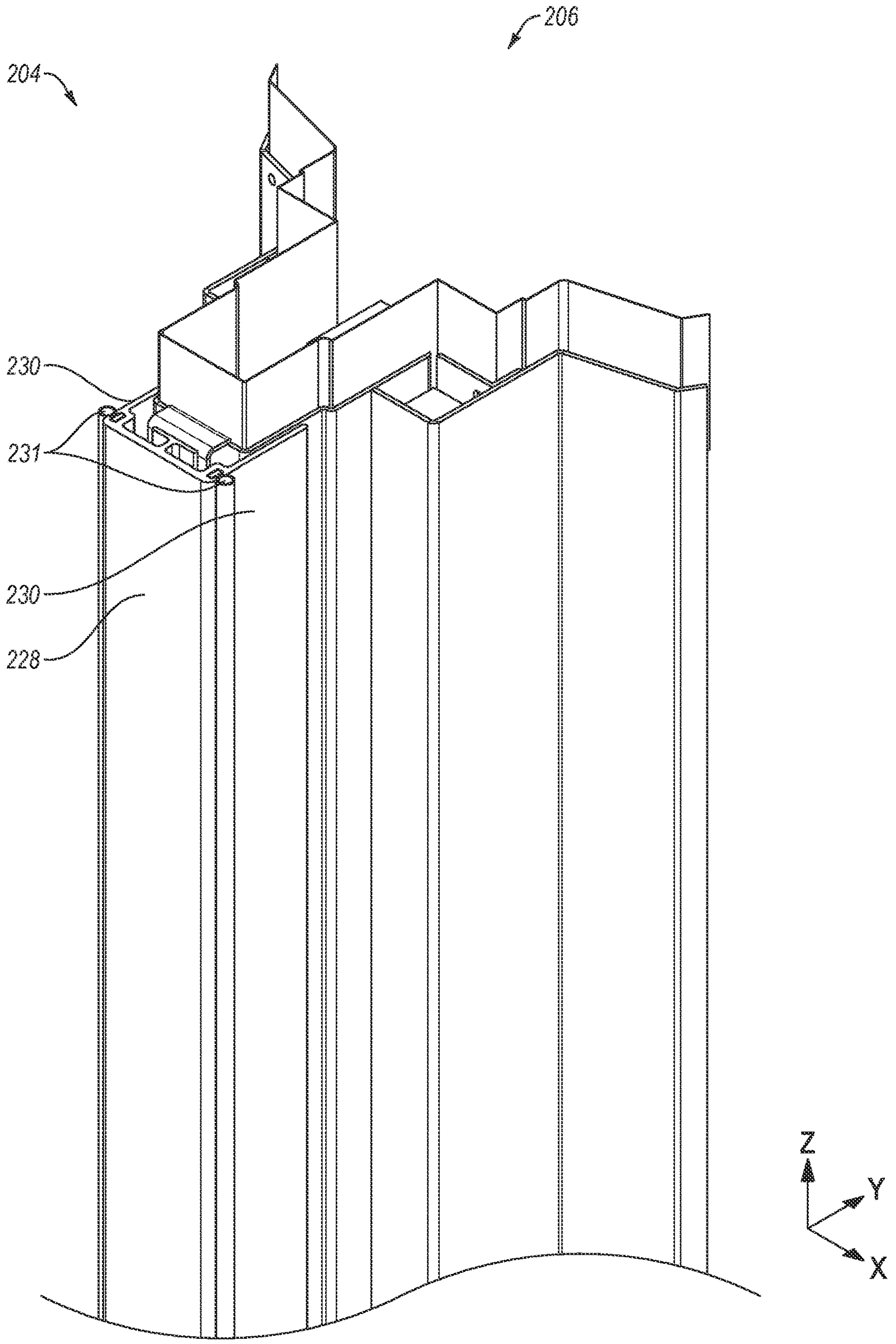
FIG. 7 is an enlarged view of a portion of the lead post of FIG. 6.

FIG. 7 is an enlarged portion of the view of FIG. 6. As shown in FIG. 7, the male protrusion 206 may comprise a leading exterior surface 228 with two exterior side surfaces 230. The leading exterior surface 228 may come in contact with an interior bottom recess surface 236 of the female receptacle 212 when the first lead post 204 and the second lead post 210 are in the closed configuration. Similarly, the exterior side surfaces 230 may come in contact with interior side surfaces 238 of the female receptacle 212. As shown in FIG. 7, an elastomeric seal 231 may be provided on each of the two exterior side surfaces 230, which may provide a barrier for smoke, sound, etc., when the doors 202, 208 are in the closed configuration. The elastomeric seals 231 may also provide a "soft" tight seal between the first lead post 204 and the second lead post 210 as the lead posts 204, 210 come into contact moving into the closed configuration.

Figure 8:
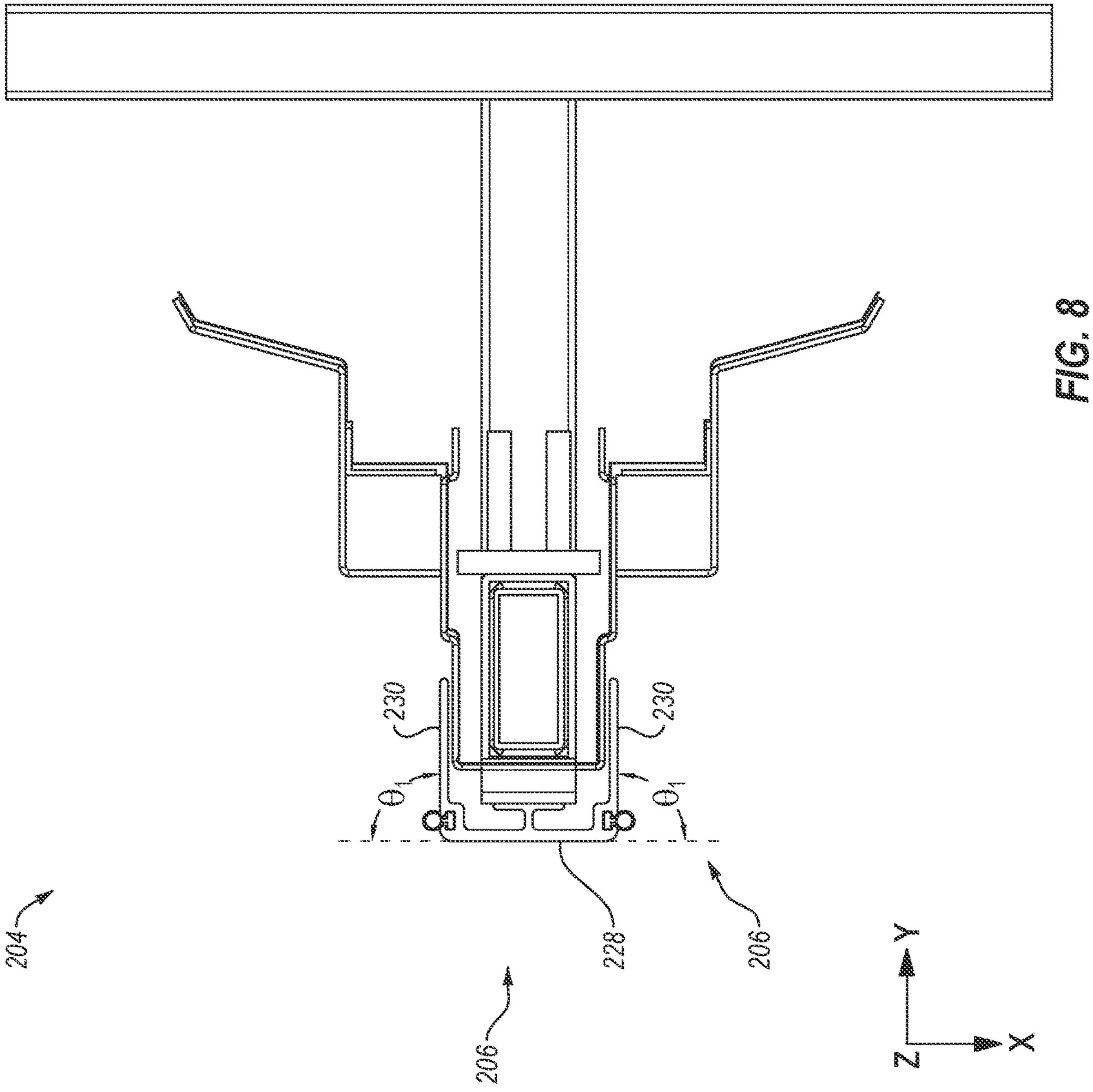
FIG. 8 is top cross-sectional view of the lead post of FIGS. 6 and 7.

FIG. 8 is a top cross-sectional view of the first lead post 204 in FIGS. 6 and 7. The exterior side surfaces 230 may extend from the first lead post 204 at a first angle θ1 relative to a plane parallel to the leading exterior surface 228 of the first lead post 204. The first angle θ1 may be in a range such as about 90° to about 140°, a range such as about 100° to about 135°, or a range such as about 105° to about 130°.

Figure 9:
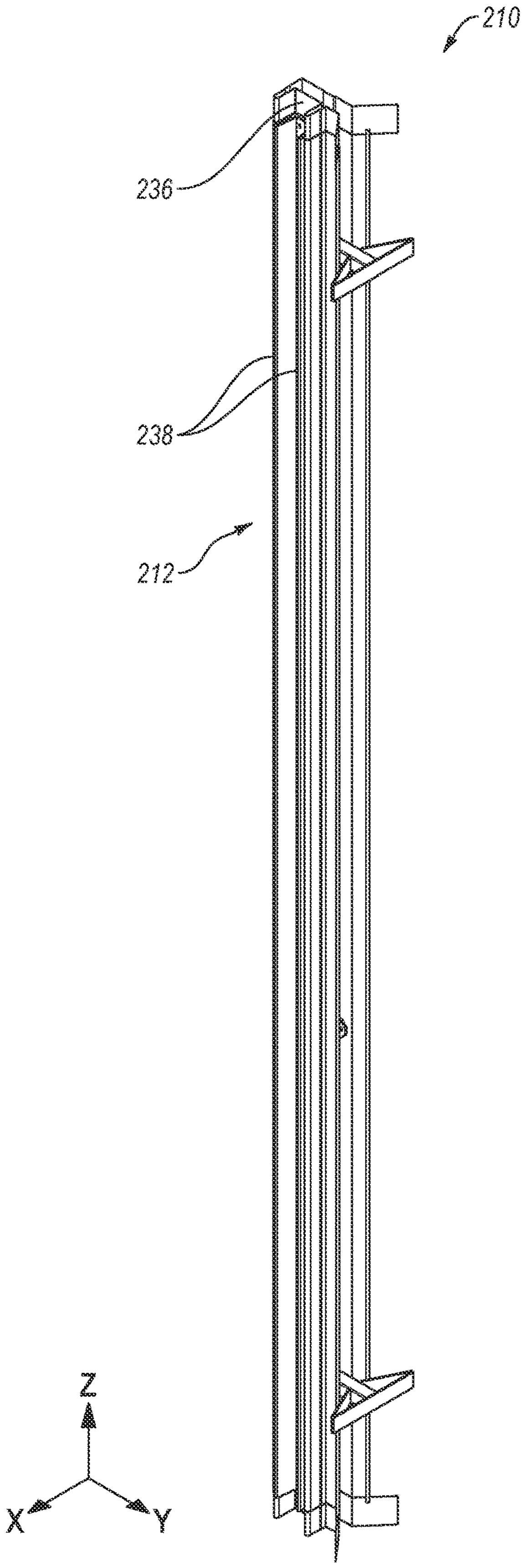
FIG. 9 is a perspective view of a lead post with a female receptacle of the automatic door system of FIGS. 4 and 5.

FIG. 9 is a perspective view of the second lead post 210 with the female receptacle 212. With reference to FIG. 9, the second lead post 210 is elongated in a vertical direction. The vertical elongation of the second lead post 210 allows the second lead post 210 to define a barrier extending at least substantially between the floor and the ceiling when it is in the joined configuration with the first lead post 204.

Figure 10:
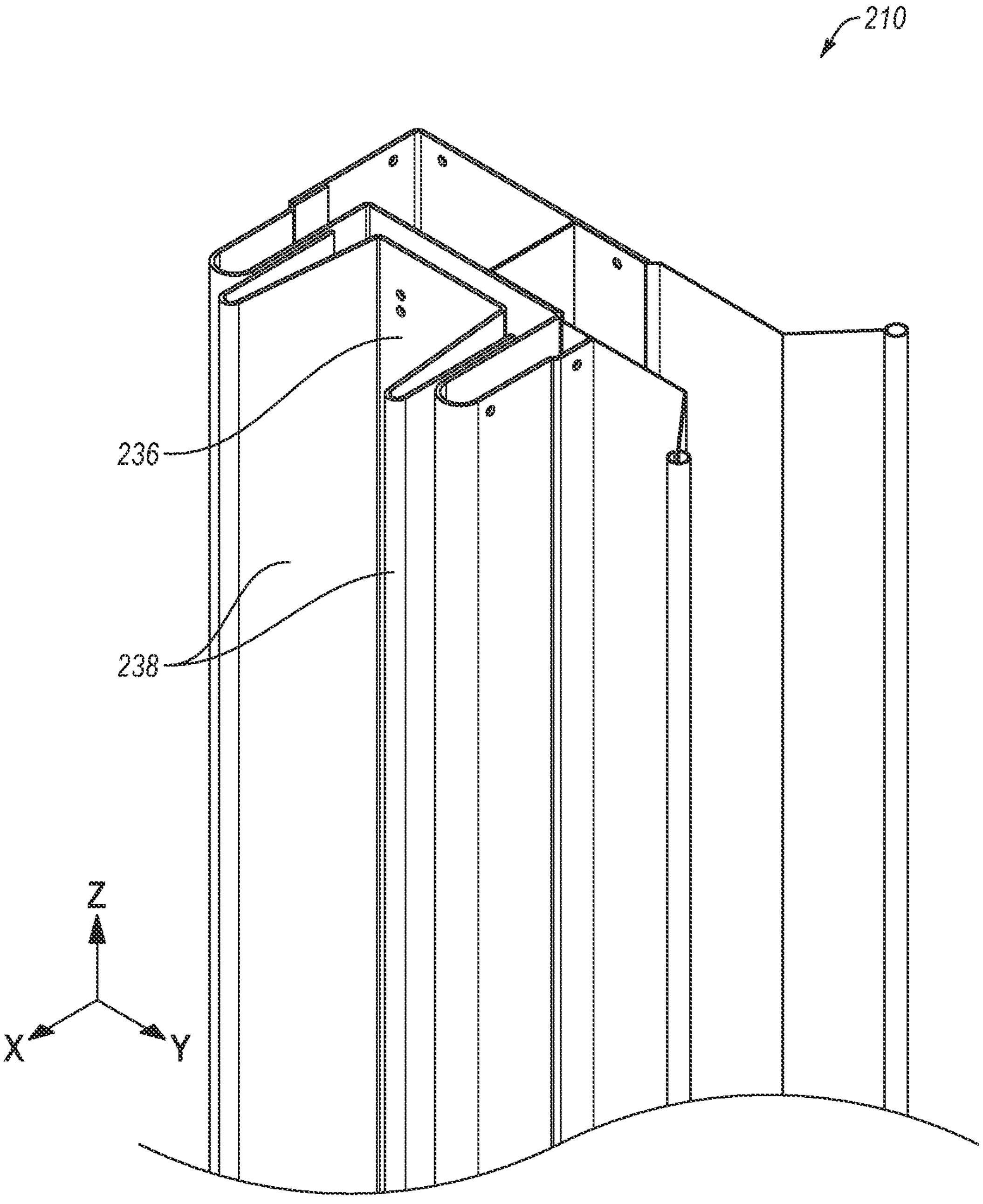
FIG. 10 is an enlarged view of a portion of the lead post of FIG. 9.

FIG. 10 is an enlarged portion of the view of FIG. 9. As shown in FIG. 10, the female receptacle 212 may comprise an elongated recess defined by the interior bottom recess surface 236 and the two interior side surfaces 238. The interior bottom recess surface 236 may come in contact with the leading exterior surface 228 of the male protrusion 206 when the first lead post 204 and the second lead post 210 are in the closed configuration. Similarly, the interior side surfaces 238 may come in contact with the exterior side surfaces 230 of the male protrusion 206 when the first and second lead posts 204 and 210 are in the closed configuration.

Figure 11:
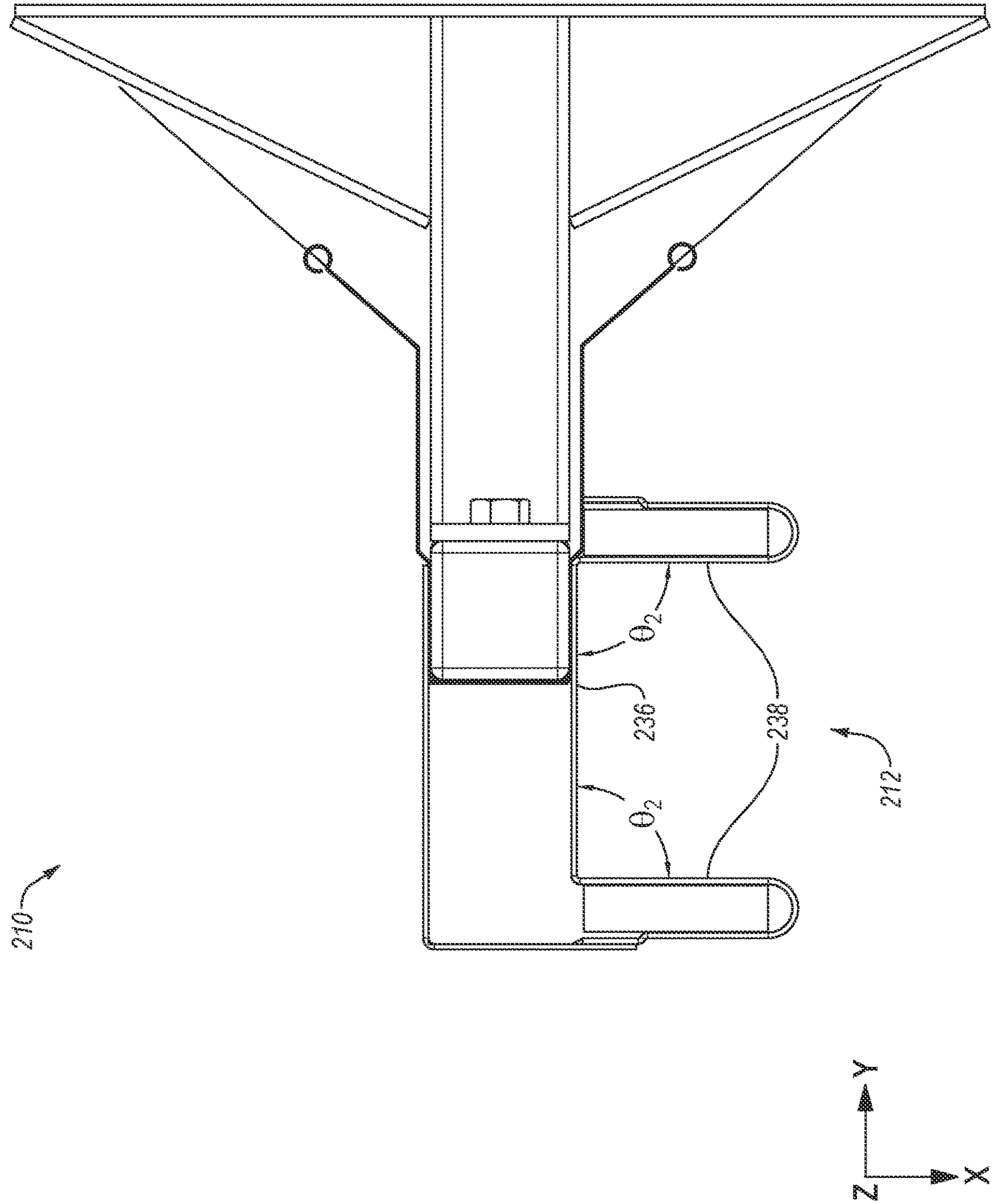
FIG. 11 is top cross-sectional view of the lead post of FIGS. 9 and 10.

FIG. 11 is a top cross-sectional view of the lead post in FIGS. 9 and 10. With reference to FIG. 11, the interior side surfaces 238 may extend from the second lead post 210 at a second angle θ2 relative to a plane parallel to the interior bottom recess surface 236. The second angle 234 may be in a range such as about 90° to about 140°, a range such as about 100° to about 135°, or a range such as about 105° to about 130°.

Figure 12:
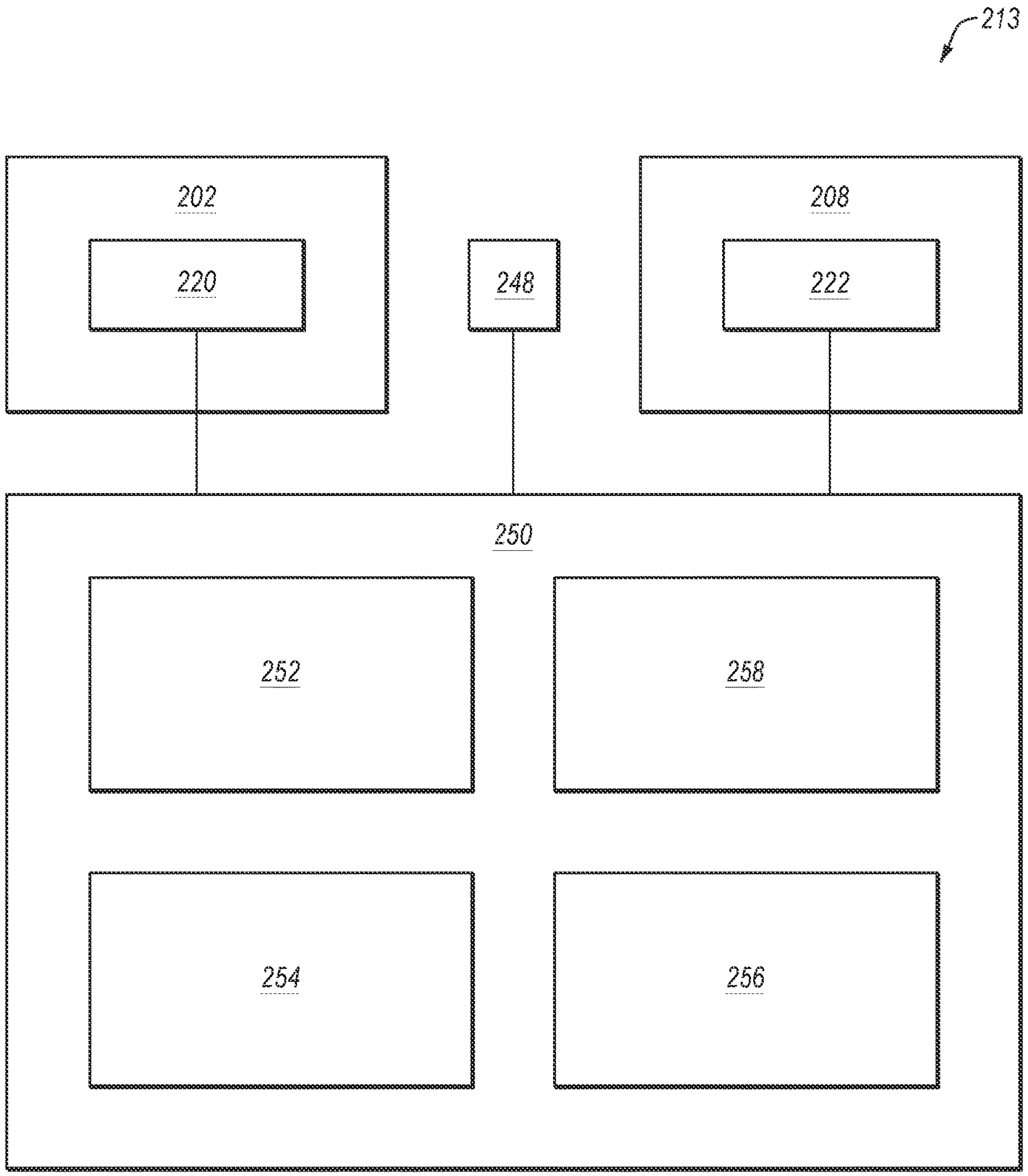
FIG. 12 is a simplified block diagram showing an electromechanical system of the automatic door system of FIGS. 4 and 5.

Referring to FIG. 12, the bi-part partition system 200 may further comprise an electro-mechanical system 213 which may be operatively coupled to each of the first door 202 and the second door 208 and configured to extend and retract the first door 202 and to extend and retract the second door 208. The electro-mechanical 213 system may comprise a first motor 220 and a second motor 222. The first motor 220 may be coupled with the first door 202 and the second motor 222 may be coupled with the second door 208. The first and second motors 220, 222 may be operatively coupled (via wires or wirelessly) to a control system 250. The control system 250 may be configured to control the first and second motors 220 and 222.

The control system 250 may comprise an input device 252. The input device 252 may actuate the control system 250. The input device 252 may be, as a non-limiting example, a button, switch, lever, or touch screen. The input device 252 may be actuated manually, or automatically by a separate system such as a timer circuit, programmable logic controller (PLC), or other type of remote-control system.

The control system 250 may comprise one or more microprocessors 254. The microprocessor(s) 254 may process data gathered from in the control system 250 and output signals and data in response to the data gathered.

The control system 250 may comprise a memory 256. The memory 256 may store data, which is input to the microprocessor 254 and/or output by the microprocessor 254, as well as data input from the input device 252 or any other device connected to the control system 250.

The control system 250 may comprise a communication module 258. The communication module 258 may be operatively coupled to the control system 250 (via wires or wirelessly) and may assist in the operation of the control system 250. As non-limiting examples, the communication module 258 may be a modem or a router. The communication module 258, however, may be any type of communication device configured to be operatively coupled to the control system 250, such as, for example, a Wi-Fi or BLUETOOTH® device.

In some embodiments, the control system 250 may comprise two door controllers, one for each door, operatively connected to one another, each comprising one or more microprocessors 254, memory 256, and a communication module 258. The two door controllers may be operatively coupled to the first and second motors 220 and 222, respectively, through a wired or wireless connection. The two door controllers may be configured to control the first and second motors 220 and 222, respectively.

The control system 250 may comprise at least one sensor 248, which is operatively coupled to the control system 250. The at least one sensor 248 may be configured to provide a signal to the control system indicating the position of the first door 202 and/or the second door 208. As non-limiting examples, the at least one sensor 248 may be an optical sensor, an ultrasonic sensor, a radio frequency sensor, a magnetic sensor, or an encoder. The at least one sensor 248 also may be or include a combination of two or more different types of such sensors.

The control system 250 may be configured to close the bi-part partition system 200 by extending the second door 208 to a predetermined extended position. The control system 250 may be configured to extend the first door to insert the male protrusion into the female receptacle 212 after the second door 208 extends to the predetermined extended position. The second door 208 may remain substantially stationary while the first door is extended and the male protrusion 206 is inserted.

In some embodiments, the at least one sensor 248 may include a sensor configured to detect the occurrence of an event or phenomenon, such as the presence of smoke or a fire, or motion, and the control system 250 may be automatically actuated to initiate closing or opening of the bi-part partition system 200 through a response to receipt of a signal from the sensor 248. For example, the input device 252 may be actuated by a detection of a signal provided by the sensor 248.

In the closed configuration, the bi-part partition system 200 provides benefits not recognized in the prior art. The bi-part partition system 200 may substantially separate a room and provide insulation between the separated spaces. In particular, the bi-part partition system 200 may provide a substantially insulating effect (e.g., insulation from sound or heat). Furthermore the bi-part partition system 200 may be installed in buildings and rooms with limited space without forcing the bi-part partition system 200 into an unfavorable or less-favorable configuration. For example, when the bi-part partition system 200 closes in a nonplanar orientation, the bi-part partition does so without the doors 202, 208 to travel along a non-linear path.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternate useful combinations of the elements described, will become apparent to those skilled in the art from the description. Such modifications and embodiments also fall within the scope of the appended claims and equivalents.

What is claimed is:

1. An automatic fire-resistant bi-part partition system, comprising:

a first door configured to extend and retract along a first direction, the first door having a first lead post including a male protrusion extending from the first lead post; and a second door configured to extend and retract along a second direction, the second door having a second lead post including a female receptacle, the female receptacle having a size and shape configured to receive the male protrusion of the first lead post therein along an insertion direction;

a first motor operatively coupled with the first door and configured to extend and retract the first door;

a second motor operatively coupled with the second door and configured to extend and retract the second door;

a control system operatively coupled with and configured to control each of the first motor and the second motor; and at least one sensor coupled to the control system, the at least one sensor configured to indicate to the control system a position of the first door and a position of the second door;

wherein the male protrusion is oriented on the first lead post and the female receptacle is oriented on the second lead post such that the insertion direction is substantially parallel to one of the first and second directions and is substantially perpendicular to the other of the first and second directions.

2. The automatic fire-resistant bi-part partition system of claim 1, wherein each of the first lead post and the second lead post are elongated in the vertical direction.

3. The automatic fire-resistant bi-part partition system of claim 2, wherein the male protrusion is an elongated protrusion on the first lead post, the elongated protrusion having a leading exterior surface and two exterior side surfaces extending from the leading exterior surface at a first angle relative to a plane parallel to the leading exterior surface.

4. The automatic fire-resistant bi-part partition system of claim 3, wherein the first angle is between 90° and 140°.

5. The automatic fire-resistant bi-part partition system of claim 2, wherein the female receptacle is an elongated recess in the second lead post, the elongated recess defined by an interior bottom recess surface of the second lead post and two interior side surfaces of the second lead post, the two interior side surfaces extending from the interior bottom recess surface at a second angle relative to a plane parallel to the interior bottom recess surface.

6. The automatic fire-resistant bi-part partition system of claim 5, wherein the second angle is between 90° and 140°.

7. The automatic fire-resistant bi-part partition system of claim 1, wherein each of the first door and the second door comprises a folding accordion-panel partition door including:

a first accordion-panel partition; and a second accordion-panel partition laterally spaced from and substantially parallel with the first accordion-panel partition.

8. The automatic fire-resistant bi-part partition system of claim 7, wherein each of the first accordion-panel partition and the second accordion-panel partition comprises a plurality of panels coupled with one another in a hinge-like manner.

9. The automatic fire-resistant bi-part partition system of claim 1, wherein the control system comprises:

a first controller operatively coupled with the first door; and a second controller operatively coupled with the second door, the second controller operatively coupled with the first controller.

10. The automatic fire-resistant bi-part partition system of claim 1, wherein the male protrusion is positioned along a centerline of the first door.

11. The automatic fire-resistant bi-part partition system of claim 1, wherein the control system is configured to insert the male protrusion into the female receptacle after the second door is extended to a predetermined extended position.

12. An automatic fire-resistant bi-part partition system, comprising:

a first door configured to extend and retract along a first direction, the first door having a first lead post including a male protrusion extending from the first lead post; and a second door configured to extend and retract along a second direction, the second door having a second lead post including a female receptacle, the female receptacle having a size and shape configured to receive the male protrusion of the first lead post therein along an insertion direction, wherein the male protrusion is oriented on the first lead post and the female receptacle is oriented on the second lead post such that the insertion direction is substantially parallel to one of the first and second directions and is substantially perpendicular to the other of the first and second directions;

an electro-mechanical system operatively coupled with each of the first door and the second door and configured to extend and retract the first door and to extend and retract the second door, the electro-mechanical system comprising:

a first motor operatively coupled with the first door and configured to extend and retract the first door;

a second motor operatively coupled with the second door and configured to extend and retract the second door; and a control system operatively coupled with and configured to control each of the first motor and the second motor, the control system configured to close the bi-part partition system by extending the second door to predetermined extended position and, thereafter, move the first door to insert the male protrusion into the female receptacle while the second door remains substantially stationary; and at least one sensor coupled to the control system, the at least one sensor configured to indicate to the control system a position of the first door and a position of the second door.

13. The automatic fire-resistant bi-part partition system of claim 12, wherein each of the first lead post and the second lead post are elongated in the vertical direction.

14. The automatic fire-resistant bi-part partition system of claim 13, wherein the male protrusion is an elongated protrusion on the first lead post, the elongated protrusion having a leading exterior surface and two exterior side surfaces extending from the leading exterior surface at a first angle.

15. The automatic fire-resistant bi-part partition system of claim 14, wherein the first angle is between 90° and 140°.

16. The automatic fire-resistant bi-part partition system of claim 15, wherein the female receptacle is an elongated recess in the second lead post, the elongated recess defined by an interior bottom recess surface of the second lead post and two interior side surfaces of the second lead post, the two interior side surfaces extending from the interior bottom recess surface at a second angle.

17. The automatic fire-resistant bi-part partition system of claim 16, wherein the second angle is between 90° and 140°.

18. A method of operating a fire-resistant bi-part partition system, comprising:

extending a first door along a first direction, the first door having a first lead post including a male protrusion extending from the first lead post; and extending a second door along a second direction, the second door having a second lead post including a female receptacle, the female receptacle having a size and shape configured to receive the male protrusion of the first lead post therein along an insertion direction; and positioning the second door at a predetermined extended position and, thereafter, moving the first door to insert the male protrusion into the female receptacle along an insertion direction while the second door remains substantially stationary at the predetermined extended position, wherein the insertion direction is substantially parallel to one of the first and second directions and is substantially perpendicular to the other of the first and second directions;

wherein the bi-part partition system further comprises an electro-mechanical system operatively coupled with each of the first door and the second door and configured to extend and retract the first door and to extend and retract the second door, the electro-mechanical system comprising:

a first motor operatively coupled with the first door and configured to extend and retract the first door;

a second motor operatively coupled with the second door and configured to extend and retract the second door;

a control system operatively coupled with and configured to control each of the first motor and the second motor, the control system configured to close the bi-part partition system by extending the second door to predetermined extended position and, thereafter, move the first door to insert the male protrusion into the female receptacle while the second door remains substantially stationary; and at least one sensor coupled to the control system, the at least one sensor configured to indicate to the control system a position of the first door and a position of the second door;

wherein the method comprises actuating the control system to cause the extending of the first door, the extending of the second door, the positioning of the second door, and the moving of the first door.

19. The method of claim 18, wherein the control system comprises:

manually actuating the control system.

20. The method of claim 18, wherein the control system further comprises at least one sensor, and wherein actuating the control system comprises automatically actuating the control system in response to detection of a signal provided by the at least one sensor.

* * * * *